May 7, 1940.                F. S. KINKEAD                2,199,824
                           SIGNALING SYSTEM
                          Filed April 7, 1938              6 Sheets-Sheet 1
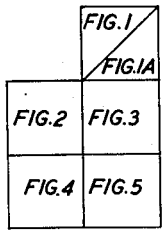
FIG.6
FIG.1A
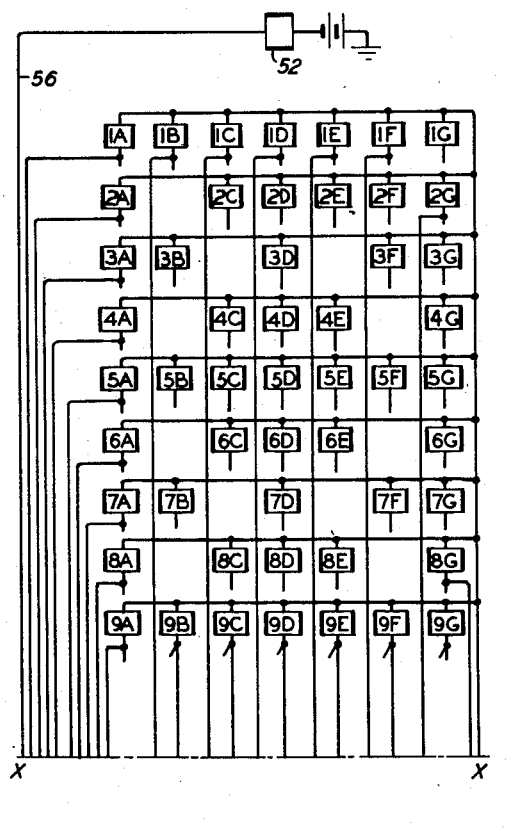
FIG.1
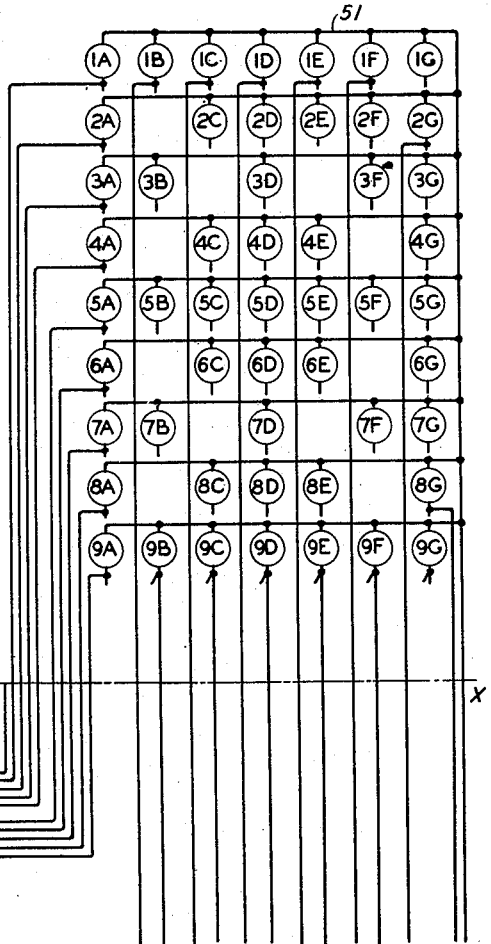
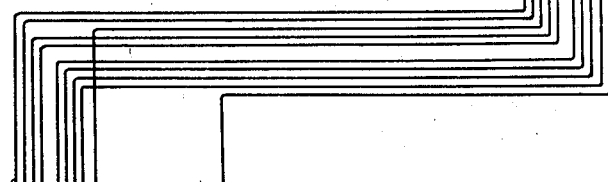
INVENTOR
F.S. KINKEAD
BY
John A. Hall
ATTORNEY May 7, 1940.　　F. S. KINKEAD　　2,199,824
SIGNALING SYSTEM
Filed April 7, 1938　　6 Sheets-Sheet 2

INVENTOR
F. S. KINKEAD
BY
ATTORNEY

May 7, 1940.   F. S. KINKEAD   2,199,824
SIGNALING SYSTEM
Filed April 7, 1938   6 Sheets-Sheet 3
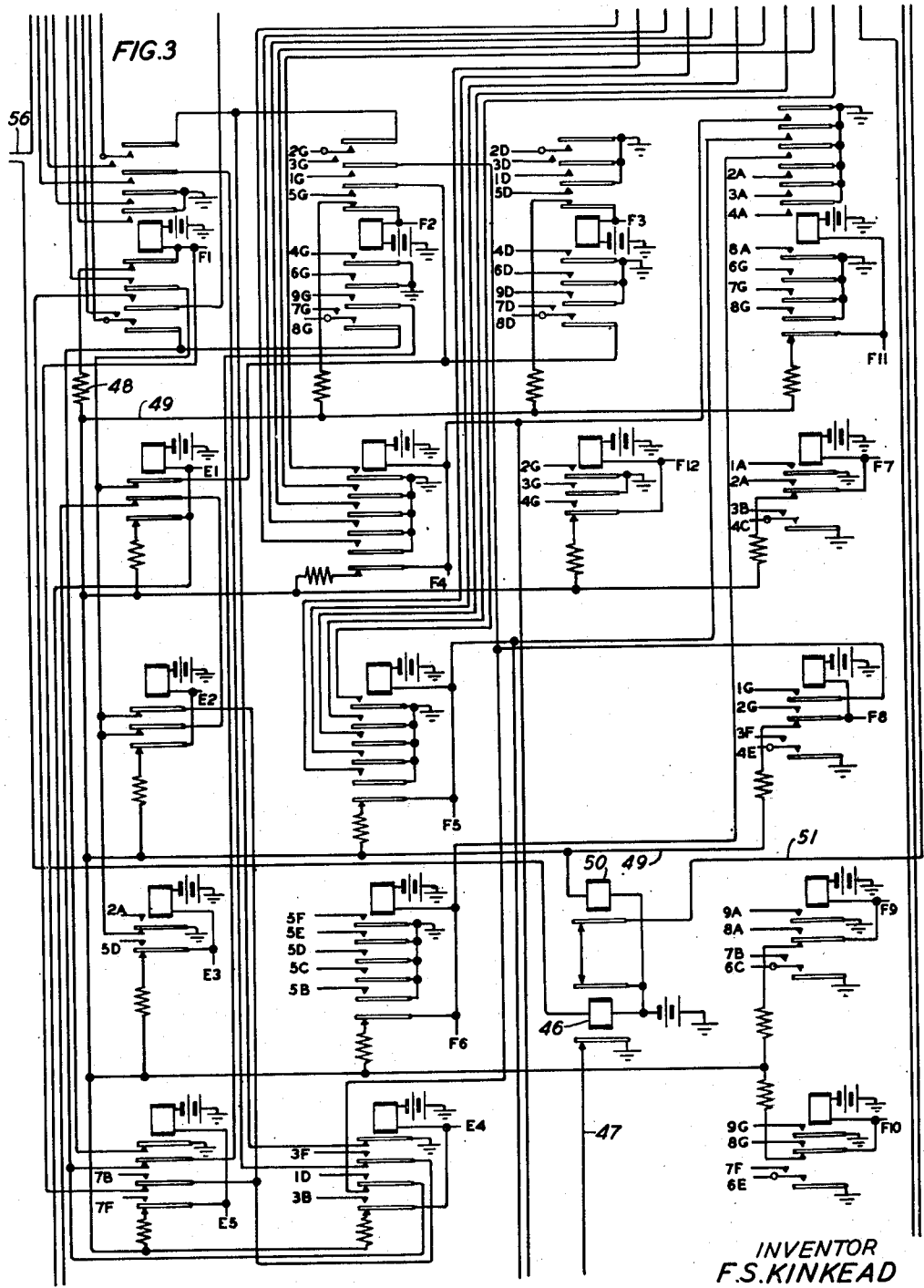
INVENTOR
F.S. KINKEAD
BY John A. Hall
ATTORNEY

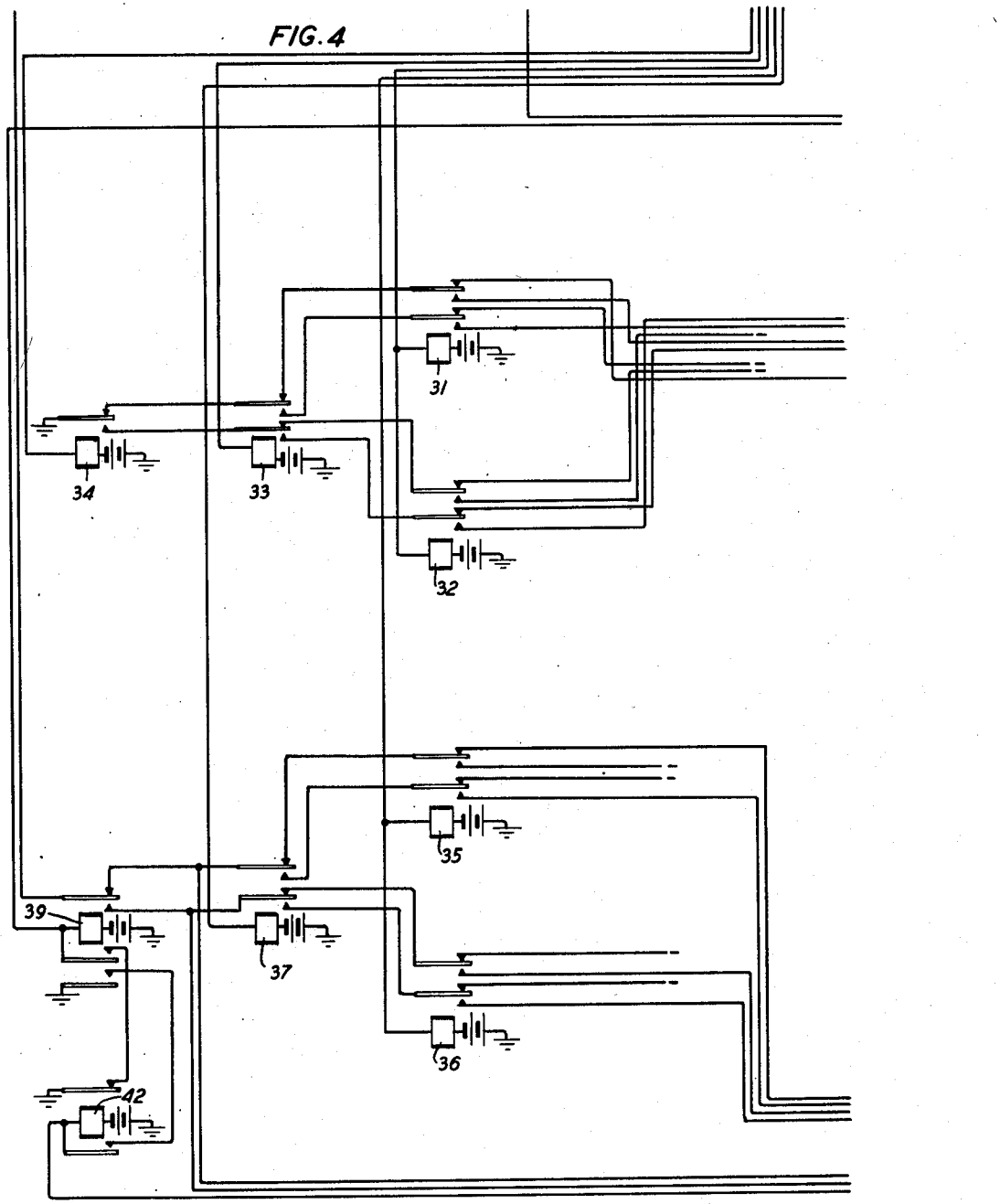

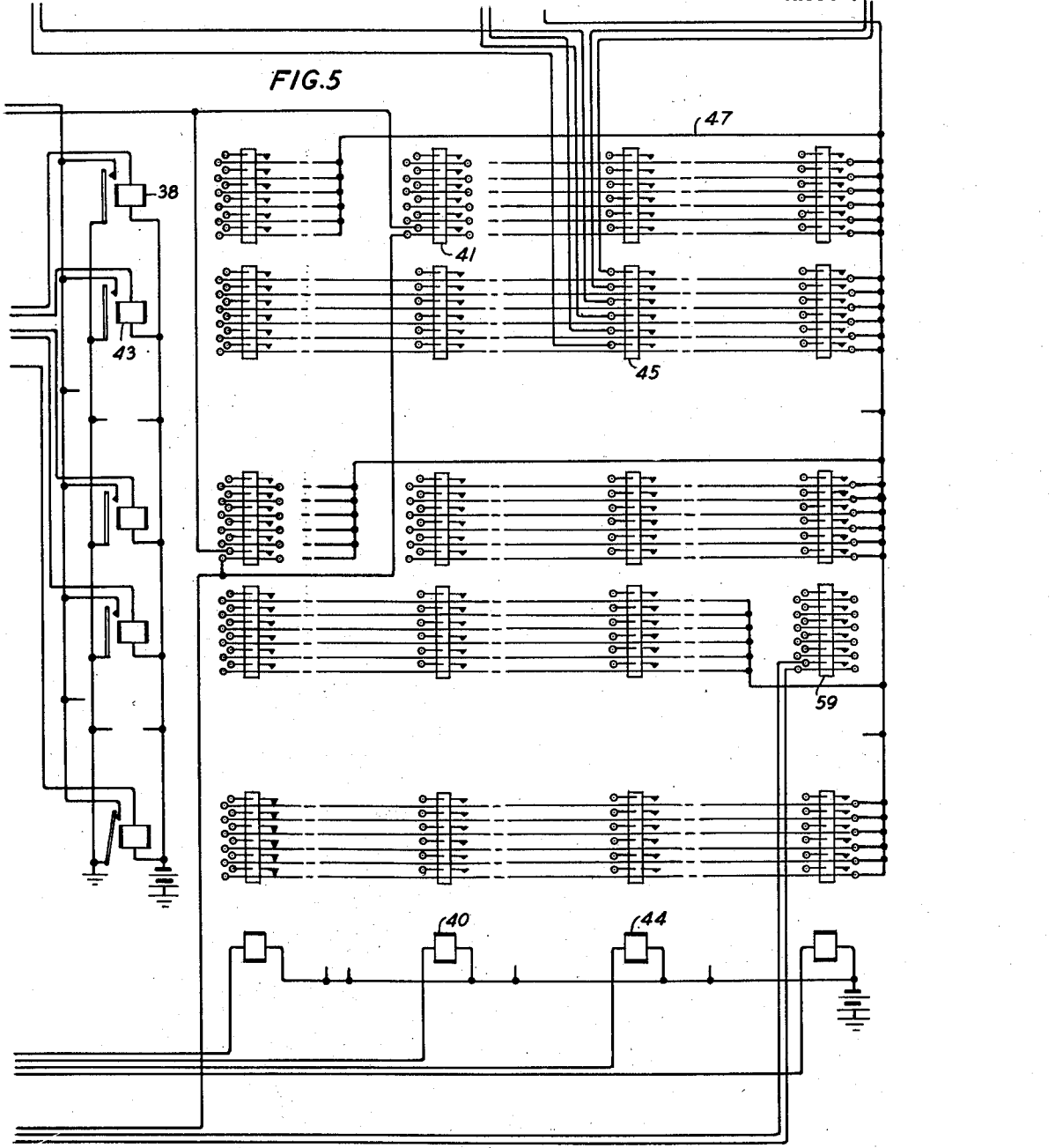

May 7, 1940.  F. S. KINKEAD  2,199,824
SIGNALING SYSTEM
Filed April 7, 1938  6 Sheets-Sheet 6

FIG. 7

| . | ; | / | LETTERS | M | V | X | LETTERS |
|---|---|---|---|---|---|---|---|
| 8C 8D | 9D 8D 8C 2D 2C | 5D F9 F8 | | 5D F8 F7 F2 F1 | 9D 8E 8C E5 F2 F1 | 5D F10 F9 F8 F7 | 9G 8D 7D 6D F5 F1 |
| , | : | ! | ( | N | C | F | K |
| 9D 8C 8D | 8D 8C 2D 2C | E1 F3 | 9C 9B 1C 1B F3 | 5D F10 F7 F2 F1 | 8G 2G E2 F5 F4 F1 | 1G F6 F4 F1 | 5D 5C 5B F10 F8 F1 |
| STOP | 0 | 6 | 1 | H | P | Y | Q |
| 8E 8C 7F 7B F3 | 5D E2 F5 F4 F2 F1 | 7A 6A 5A 2G F11 | 9E 9C 2C F3 | F6 F2 F1 | F12 F6 F4 F1 | 8D 7D 6D 5D F8 F7 | E2 F10 F5 F4 F2 F1 |
| SPACE | 8 | BELL | 7 | SPACE | I | S | U |
| | E3 F6 F5 F4 F2 F1 | | 5D 1G F9 F8 F4 | 5D | 9E 9C 1E 1C F3 | 2G F11 | 1G 1A E2 F5 F2 F1 |
| 9 | & | ? | FIGURES | 0 | G | B | FIGURES |
| 5G 4G 3G 2G F11 | 7D 6D 4D 3D F6 | 9D 6D 5D E3 F8 F4 | 3D 2D 1G F6 F4 F1 | E2 F5 F4 F2 F1 | 2G F10 F5 F4 F1 | E1 F6 F5 F4 F2 F1 | |
| CARRIAGE RETURN | 4 | $ | , | CARRIAGE RETURN | R | D | J |
| 7D 6C 5G 4C 3D F6 | 5A 4A 3B 2C F6 F3 | 8D 7D 2G F11 F3 | 3D 2D 2C | 7D 6C 5G 4C 3D F6 | F12 F10 F6 F4 F1 | 5G E1 F5 F4 F2 F1 | 8A 1G E2 F5 F2 |
| 5 | ) | ” | 2 | T | L | Z | W |
| 5A 1G 1A F11 | 9F 9E 1F 1E F3 | 3F 3D 2F 2E 2D 2C | 9G E3 F9 F8 F5 F4 | 1G 1A F4 F3 | 9G F5 F1 | 5D F9 F8 F5 F4 | 5D F10 F9 F2 F1 |
| BLANK | LINED | 3 | — | BLANK | LINED | E | A |
| 9D 5G 5D 5A 1D | LF 3F IE 3B NE 2E ED 2C F3 | 8A E3 F6 F5 F4 F2 | F6 | 9D 5G 5D 5A 1D | LF 3F IE 3B NE 2E ED 2C F3 | 9G 1G F6 F5 F4 F1 | 2E 2C E4 F6 F2 F1 |

INVENTOR
F. S. KINKEAD
BY John Attall
ATTORNEY

Patented May 7, 1940

2,199,824

UNITED STATES PATENT OFFICE 2,199,824

SIGNALING SYSTEM

Fullerton S. Kinkead, New York, N. Y., assignor to Bell Telephone Laboratories, Incorporated, New York, N. Y., a corporation of New York Application April 7, 1938, Serial No. 200,666

2 Claims. (Cl. 177—353)

This invention relates to electric signaling systems and particularly to annunciator systems wherein the characters to be displayed are posted at any given point, remote or otherwise, through the manipulation of keys in a bank of keys such as those used in typewriting machines.

The invention may be regarded as a useful combination of composite printing controlled by machine switching devices set in action by permutation code sending devices over telegraph lines.

An object of the invention is to post letters, numerals or other understandable characters of any desired size at a given point through the agency of known transmitters in regular and commercial service generally of a different character. Specifically and as one example the regular teletypewriter senders in use in hotels or business establishments may be switched to a line leading to a cab calling annunciator and appropriate numerals displayed. As another example a regularly used teletypewriter in general use for sending written messages may be temporarily switched to a line leading to a stock quotation board and appropriate messages either of a transitory or permanent character displayed. In another application it may be used for posting the results of athletic or sporting events through the temporary use of a teletypewriter transmitter. The invention is, however, not limited to the temporary use of a teletypewriter transmitter for when the traffic is heavy enough such a transmitter may be permanently associated with a line leading to an annunciator. Nor is the invention to be limited to the use of an annunciator for the visual display of letters, numerals and characters before crowds but where it finds application may be used at points observable by a single individual or it may be utilized to operate devices intended to produce a written record by inked ribbon means, electrochemical action, indentation, perforation or any other desirable means. In one specific form it may be used to actuate a small message viewing device as set forth and described in my Patent No. 2,173,170, based on application Serial No. 200,665 filed on even date herewith.

A feature of the invention is translating means responding sequentially to a code for operating means responding simultaneously to such code translated for in turn selectively operating the elements of a composite character forming annunciator.

According to another feature of the invention sequentially responding means are employed for selectively operating a coordinate switch which in turn selectively operates the composite character forming elements of an annunciator.

In accordance with another feature of the invention means are provided for selectively operating a coordinate switch through permutation code impulses the switch being completely set in both its coordinate directions by a single code train.

In accordance with another feature of the invention the principle of subtraction is used in the composite character forming means. Heretofore, composite characters have been formed by adding together several standard strokes, each of which is common to several characters. In the present invention standard common strokes are used and in some instances parts of such strokes are subtracted.

The drawings consist of six sheets, five of which are in the form of circuit diagrams and the last of which is in the form of a chart. Figs. 1 to 5, inclusive, when placed together as indicated in Fig. 6, form a complete circuit diagram illustrating the present invention.

Fig. 1 and Fig. 1A are alternative forms of annunciators. Fig. 1 is in the form of a bank of electric lamps. The annunciator formed thereby therefore may be of any size, limited only by the practical size of electric lamps. Fig. 1A is a similar arrangement in which magnets are used instead of lamps. These magnets may operate any sort of device which will act as an annunciator. For instance, each magnet may control a paper punch so that when a number of magnets are operated simultaneously they will punch holes in a tape which may be run in front of an illuminated surface and thus give an indication;

Fig. 2 shows a permutation code sending and receiving means. The sending means is indicated conventionally and the receiving means is shown more in detail. In this instance, the receiving means consists of a start-stop distributor, shown conventionally, operating a set of receiving relays and a set of transfer relays to which the record made on the receiving relays is transferred while the receiving relays are receiving the next record;

Fig. 3 is a circuit diagram showing a number of relays which act to energize the lamps of Fig. 1 or the magnets of Fig. 1A;

Fig. 4 is a set of fanning-out relays which respond to the record made on the transfer relays;

Fig. 5 shows diagrammatically a coordinate or cross-bar type of switch which is selectively operated through means of the fanning-out relays and which in turn operates the relays of Fig. 3; and Fig. 7 is a chart showing the relays and the various lamps or magnets which are operated in response to the operation of any particular set of contacts on the cross-bar switch of Fig. 5.

Figure 2:
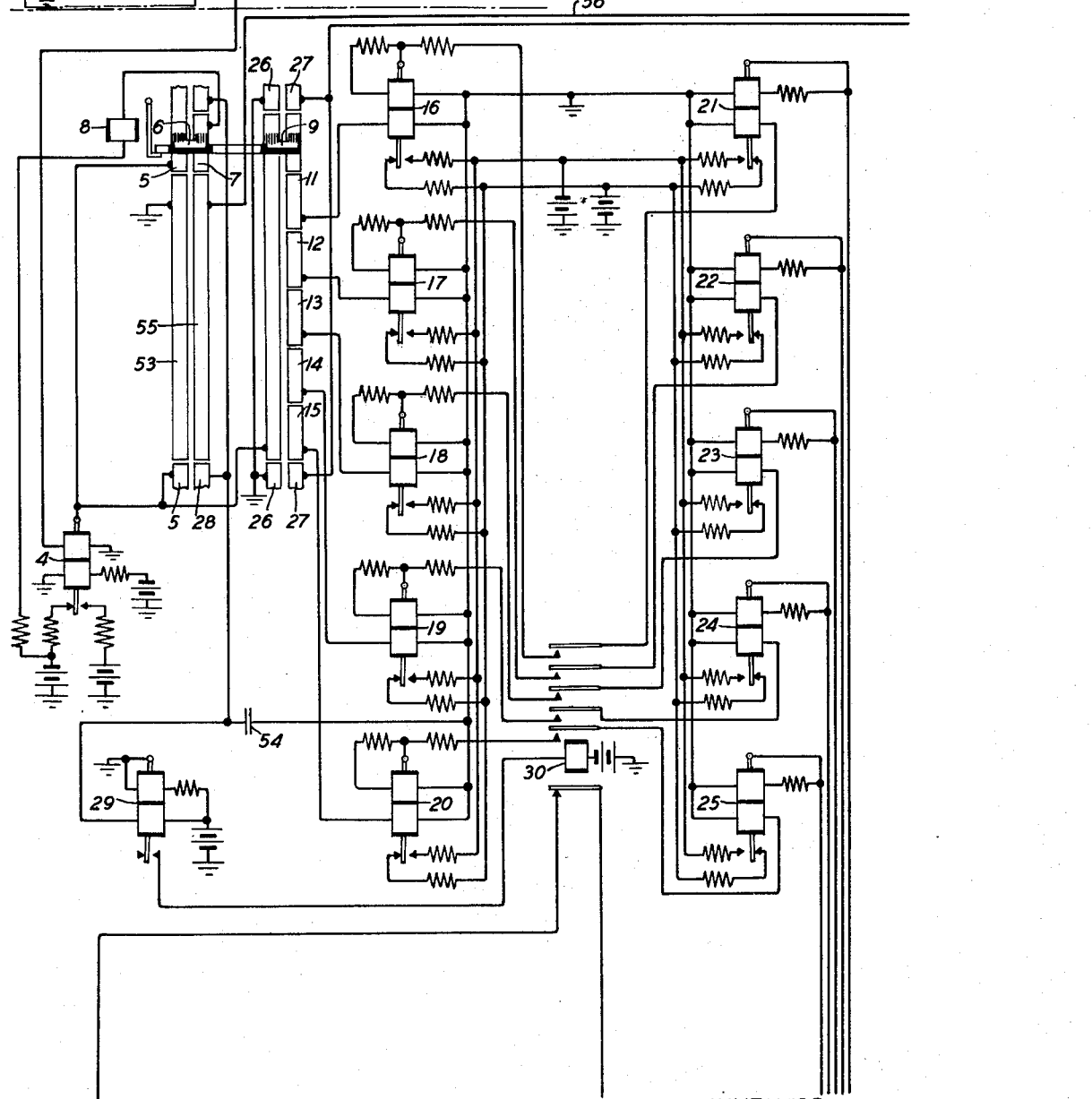

For a full understanding of the nature of the cross-bar or coordinate switch shown diagrammatically in Fig. 5, reference is made to Patents 1,953,503 and 2,021,329 granted to J. N. Reynolds.

It will be assumed that the annunciator in Fig. 1 is to be operated from a distant point and through the agency of a regular teletypewriter which may be in service for other purposes. In Fig. 2 this teletypewriter is conventionally illustrated in the box 1. The line running from this teletypewriter may be manually switched by switch 2 to line 3 and thence to the circuit of Fig. 2, or it may be continued through a central office 57 and there switched through means responsive to its own operation to a line 58 which may also lead to the circuit of Fig. 2. It will be understood, of course, that if the use of apparatus of this nature so warrants, the teletypewriter of Fig. 1 may be permanently and directly connected to the circuit of Fig. 2. It will still further be understood that it is not necessary to use a complete teletypewriter instrument but that any suitable permutation code sender may be substituted for the apparatus conventionally shown in box 1.

Let us assume that the teletypewriter 1 is connected through the switch 2 to the line 3 and thence to relay 4. Under normal conditions a circuit will be completed for energizing the upper winding of relay 4 but this is in opposition to the biasing winding and the armature will be resting on its left-hand or marking contact.

Whenever a character is to be transmitted the circuit is opened for an interval to form a spacing impulse. This allows the armature to move to its right-hand or spacing contact, whereupon a circuit is established through the commutator segment 5, the brush 6 to commutator segment 7, thence through start magnet 8 to battery of the opposite polarity. In a manner well known magnet 8 will allow the brush 6 to start on its travel and this travel will continue until the brush 6 has moved back to the position shown in the drawings. During this time the brush 9 will connect the commutator segment 10 to the segments 11, 12, 13, 14 and 15 in sequence and since these latter segments are connected to relays 16 to 20, inclusive, these relays will be energized in accordance with the permutation code sent out by the teletypewriter 1. When the brush 9 leaves the segment 15, the companion brush 6 will bridge segments 5 and 28 until the normal position is reached. At this time, and since teletypewriter 1 has returned to its marking position, a circuit will be closed for relay 29 and this in turn will cause the energization of relay 30. Therefore, during the period that the brushes of the distributor are returning to their normal locked-in position the armatures of relays 16 to 20, inclusive, will be connected to the windings of relays 21 to 25, inclusive, respectively, and those of relays 16 to 20, inclusive, which have been moved to their right-hand contacts, will cause a corresponding movement of the armatures of relays 21 to 25, inclusive, respectively, to their left-hand contacts.

As soon as the brush 6 has left segment 28 relay 29 will return to normal and allow relay 30 to become deenergized. Condenser 54 connected to ground, in being charged, renders relay 29 slow releasing.

It is thus clear that any permutation code sent out by the teletypewriter 1 will be recorded by the movement of the armatures of relays 21 to 25, inclusive.

Let it be assumed that the letter C is to be transmitted, by way of example. The operator, to be sure that the annunciator is in the proper condition to receive letters instead of figures, will transmit the code for "Letters." According to a well-known and regularly used code, this will consist of five marking impulses, which will result in the energization of relays 31 to 37, inclusive. During the energization of relay 30 and as soon as relays 23, 24 and 25 have been energized, the relays 31 to 34, inclusive, will operate and establish a circuit from ground to the horizontal cross-bar magnet 38. This will prepare for energization all of the sets of contacts on the cross-bar switch in a corresponding horizontal row. When relay 30 becomes deenergized a circuit will be established from ground, the armature and contact of magnet 38, lower armature and back contact of relay 30, upper armature and back contact of relay 39, upper armature and front contact of relay 37, inner armature and front contact of relay 35, winding of magnet 40 to battery. Magnet 40 energizes and operates the set of cross-bar contacts 41. This closes a circuit for relay 39 extending through a pair of contacts in the set 41, back contact and upper armature of relay 39 to ground supplied by the armature and front contact of magnet 38. Relay 39 locks through its inner lower armature and front contact and the back contact and upper armature of relay 42 and will stay in this condition until a "Figures" code is sent to energize relay 42.

The code for the letter C is now sent. This consists of one spacing impulse, followed by three marking impulses, in turn followed by one spacing impulse. This will result in the energization of relays 22, 23 and 24, which in turn will result in the energization of relays 31, 32, 33, 35 and 36.

While relay 30 is energized relays 31, 32 and 33 will become energized and will result in the establishment of a connection from ground, the armature and back contact of relay 34, the upper armature and front contact of relay 33, the inner armature and front contact of relay 31, winding of magnet 43 to battery. When relay 30 becomes deenergized a circuit will be established from ground, the armature and front contact of magnet 43, the lower armature and back contact of relay 30, the upper armature and front contact of relay 39, the inner armature and back contact of relay 37, the upper armature and front contact of relay 36, winding of vertical magnet 44 to battery. Through the previous energization of magnet 43 and the subsequent energization of magnet 44 the set of contacts 45 in the cross-bar switch is operated. At this time a circuit will be completed from ground, the lower armature and back contact of relay 46, conductor 47 and thence through each of the contacts in the set 45 to various relays in Fig. 3 and lamps in Fig. 1. According to the chart (Fig. 7) lamps 8G and 2G are energized and relays E2, F5, F4 and F1 are energized. Following up the circuits from each of these relays it will be noted that relay F1 will energize lamps 1A to 9A, inclusive, that is, relay F1 controls a standard downward stroke at the left-hand side of the figure, which stroke might be standard in such letters as B, C, D, E, F, etc. Relay F4 energizes lamps 1B, 1C, 1D, 1E, and 1F which form a standard stroke useful in such letters as C, D, E, F, T, etc. Relay F5 energizes lamps 9B, 9C, 9D, 9E and 9F which form a corresponding stroke at the base of the letters. However, the letter C which we are now forming should be somewhat rounded at the corners and hence the relay E2 is energized to subtract the corner lamps 1A and 9A, with the result that he lamps now energized will be the following: 2G, 1F, 1E, 1D, 1C, 1B, 2A to 8A, inclusive, 9B, 9C, 9D, 9E, 9F and 8G.

When the ground is placed on the windings of relays F1, F4, F5 and E2 this ground is extended through an armature and back contact of each of these relays through a resistance such as 48 to conductor 49 which extends through the winding of relay 50 to battery, so that it is not until each of the relays designated by the particular code being sent has been fully energized that relay 50 is allowed to resume its normal position. When relay 50 returns to normal, the ground supplied to the individual leads of the lamps to be energized is connected through such lamps to the common conductor 51 which extends through the armature and back contact of relay 50 and the back contact and upper armature of relay 46 to battery, thus energizing the lamps picked out by the particular code sent.

When the operator at teletypewriter 1 sends another code the impulses will be written on relays 16 to 20, inclusive, and when this has been completed and the brush 9 has moved off segment 15 it will complete a circuit from segment 26 to segment 27 and thus energize relay 46 so that while the record written on relays 16 to 20, inclusive, is being transferred to relays 21 to 25, inclusive, the record displayed by the annunciator of Fig. 1 will be erased. If the set of magnets in Fig. 1A is being used instead of the set of lamps in Fig. 1, the magnet may be used in a well-known manner to advance a tape or any other means to prepare for the recording of a succeeding character by the next energization of a selected set of the magnets when the relay 50 becomes deenergized. Magnet 52 may be energized after the selected set of magnets of Fig. 1A has been energized through a circuit from ground segment 53, brush 6, segment 55 and conductor 56 to magnet 52.

It will be noted that the lamps of Fig. 1 and the magnets of Fig. 1A are arranged in seven vertical and nine horizontal rows and that some of these lamps or magnets are omitted. This is by way of illustration only since a complete set of lamps or magnets might be used, or any lesser number which would be found convenient to form the letters and characters desired. It will be noted that the conductors from the lamps in Fig. 1 proceed directly past the line XX and are directly connected to the relay contacts of Fig. 3. The conductors to the magnets of Fig. 1A are ended at the line XX as an indication that they might be connected in a similar manner to the relays of Fig. 3.

If it is wished to display any of the characters shown in the first four vertical columns of the chart in Fig. 7, the code for "Figures" is sent, whereupon the contacts of set 59 of the crossbar switch in Fig. 5 are closed so that relay 42 now becomes energized. Relay 42 locks through its lower armature and front contact to the front contact and lower armature of relay 39. This opens the locking circuit of relay 39 and therefore relay 39 returns to normal and relay 42 will become deenergized. Thereafter any code for any one of the figures shown may be sent and will result in the energization of a particular set of contacts on the cross-bar switch.

What is claimed is:

1. In a signaling system, a permutation code sender, a switch comprising coordinate sets of permanently paired contacts, a set of vertical coordinate magnets and a set of horizontal coordinate magnets, means responsive to a single train of code impulses transmitted from said sender for selectively operating one of each said set of magnets for selectively operating a single set of said permanently paired contacts, a composite character forming device comprising means for selectively adding together common character forming elements and means for subtracting parts from said common character forming elements and means selectively controlled by said sets of permanently paired contacts for operating said adding and subtracting means in various combinations.

2. In a signaling system, a permutation code sender, a switch comprising coordinate sets of permanently paired contacts each said set comprising a plurality of pairs of contacts, a set of vertical coordinate magnets and a set of horizontal coordinate magnets, means responsive to a single train of code impulses transmitted from said sender for selectively operating one of each said set of magnets for selectively operating a single set of said permanently paired contacts, a composite character forming device comprising a plurality of geometrically arranged units separately operable by contacts of said switch, means responsive to other contacts of said switch for operating said units in groups each defining a common character forming element, and subtracting means responsive to other contacts of said switch for rendering selected units of said groups inoperable whereby the selective operation of said sets of contacts will operate said composite character forming device by simultaneously operating said units, said group operating means and said subtracting means.

FULLERTON S. KINKEAD.